United States Patent

Johnston, Jr. et al.

[11] Patent Number: 5,884,583
[45] Date of Patent: Mar. 23, 1999

[54] FIELD BAG BOOST VACCINATION DELIVERY SYSTEM

[75] Inventors: Joseph H. Johnston, Jr., Gainsville, Ga.; Gregory D. Boggess, Charles City, Iowa

[73] Assignee: Rhone Merieux, Inc., Athens, Ga.

[21] Appl. No.: 828,418

[22] Filed: Mar. 28, 1997

[51] Int. Cl.⁶ ....................................................... A01K 7/00
[52] U.S. Cl. ............................. 119/72; 137/861; 137/883
[58] Field of Search .................. 119/72, 71, 74, 119/72.5; 251/4, 7; 604/80, 246, 251; 137/861, 883

[56] References Cited

U.S. PATENT DOCUMENTS

| | | |
|---|---|---|
| 3,822,056 | 7/1974 | Hawes, Jr. et al. . |
| 3,901,194 | 8/1975 | Meyer et al. . |
| 3,937,241 | 2/1976 | Cloup . |
| 3,971,341 | 7/1976 | Bron .......................................... 119/72 |
| 4,060,351 | 11/1977 | Cloup ...................................... 417/520 |
| 4,248,176 | 2/1981 | Kilstofte ................................... 119/72 |
| 4,248,401 | 2/1981 | Mittleman . |
| 4,329,940 | 5/1982 | Humphries ............................... 119/72 |
| 4,335,866 | 6/1982 | Bujan ........................................ 251/9 |
| 4,411,661 | 10/1983 | Kersten .................................... 604/411 |
| 4,441,459 | 4/1984 | Giordano . |
| 4,463,706 | 8/1984 | Meister et al. ........................ 119/51 R |
| 4,472,378 | 9/1984 | Shuster et al. ............................. 424/92 |
| 4,540,403 | 9/1985 | Theeuwes ................................. 604/85 |
| 4,628,866 | 12/1986 | Israel et al. . |
| 4,643,354 | 2/1987 | Stowe . |
| 4,699,613 | 10/1987 | Donawick et al. . |
| 4,750,643 | 6/1988 | Wortrich .................................. 222/81 |
| 4,757,784 | 7/1988 | Hammer . |
| 5,006,341 | 4/1991 | Davis et al. . |
| 5,143,257 | 9/1992 | Austin et al. . |
| 5,163,923 | 11/1992 | Donawick et al. . |
| 5,230,302 | 7/1993 | Steudler, Jr. . |
| 5,357,902 | 10/1994 | Norval et al. . |
| 5,468,227 | 11/1995 | Haskell . |

Primary Examiner—Michael J. Carone
Assistant Examiner—James S. Bergin
Attorney, Agent, or Firm—Frommer Lawrence & Haug LLP; William S. Frommer; Thomas J. Kowalski

[57] ABSTRACT

A method for orally administering medicaments to a plurality of animal drinking stations, and an apparatus for accomplishing the method. A medicament reservoir is separately connected to each of the drinking stations via tubes each of an identical predetermined diameter. Medicament is allowed to flow through each of the tubes to each drinking station. Substantially identical rate of medicament flow to each drinking station is insured by the identical predetermined diameter of each of the tubes.

26 Claims, 1 Drawing Sheet

FIELD BAG BOOST VACCINATION DELIVERY SYSTEM

BACKGROUND OF THE INVENTION

1. Field of the Invention

This invention relates to a method for the delivery of substantially identical dosages of medicament at substantially identical rates to each of a plurality of domestic animal drinking stations, wherein the inventive method has the attendant advantages of increased sterility and increased protection from adverse environmental conditions in the delivery of medicaments.

This invention further relates to an apparatus for accomplishing this method, which apparatus includes a common source medicament reservoir connected to a plurality of animal drinking stations in such a manner that the above-described conditions relating to dosage, dosage rate, sterility and environmental shielding are implemented.

2. Description of Related Art

Domestically raised poultry are subject to a variety of infectious diseases, many of which are controlled through vaccination using modified live or killed vaccines. It has been discovered that oral vaccination through the water supply provides a simple and inexpensive method to immunize poultry against infectious agents. For instance, it has been found that the oral administration of a modified live Newcastle Disease Virus (NDV) vaccine administered in drinking water protects poultry against experimental challenge with virulent NDV isolates, as well as against natural exposure with this virus.

Vaccines for oral immunization are often administered in poultry houses by adding the vaccine to a common outlet such as a drinking water reservoir using "proportioner" apparatus. Proportioner apparatus are described in U.S. Pat. No. 3,937,241 to Cloup and U.S. Pat. No. 4,060,351 to Cloup, both of which are hereby incorporated by reference in this application. This type of field vaccination practice does not optimize vaccine delivery conditions with respect to vaccine titer or sterility and thus may result in poorly vaccinated or unvaccinated flocks.

Medicaments may also be administered non-orally by a variety of methods and with a variety of apparatus. One such apparatus is described in U.S. Pat. No. 5,468,227 to Haskell, which describes a solenoid driven hypodermic needle which pierces the wing of a bird. A positive displacement pump delivers medicament to the needle for administration. The Haskell apparatus has the obvious disadvantage of requiring that each bird to be treated must be captured and handled prior to administration. Thus, Haskell discloses a relatively inefficient method of medicament administration. Moreover, due to its construction, the Haskell apparatus may be inoperative with respect to animals other than birds which may not possess anatomical features, such as a bird's wing, which are easily or effectively pierced.

Stowe, in U.S. Pat. No. 4,643,354, describes an apparatus for high volume vaccination in which a vaccine is atomized in close proximity to poultry cages. Vaccine is then ingested by the treated birds via inhalation. Although this apparatus accomplishes high volume vaccination, it too has several disadvantages. First, atomized vaccine may not be easily administered due to air currents, wind and the like. Further, atomized vaccine has only a limited effective airborne time, and vaccination would necessarily have to result shortly after atomization. When applied to medicaments such as antibiotics for which sustained dosing is preferred, the atomization apparatus would be either ineffective or would cause logistical problems due to its being cumbersome. Moreover, the Stowe apparatus employs a "shotgun" approach to medicament administration, where a large amount of medicament is atomized to insure that a small amount of medicament actually is ingested. As the majority of atomized vaccine will not be ingested, Stowe is wasteful of expensive medicaments.

It has therefore been found desirable to provide a system which would deliver vaccine at a specified flow rate and provide for a more sterile reservoir environment which would lead to better vaccination rates and more effective control of infectious diseases. Such a system would also be useful for oral administration of medicaments to any other type of domesticated animals.

OBJECTS OF THE INVENTION

An object of the present invention is to provide an efficient method for oral administration of medicaments to domesticated animals, and an apparatus for accomplishing same.

A more particular object of the invention is to provide an efficient method for oral administration of vaccines to domesticated animals, and an apparatus for accomplishing same.

A further object of the invention is to provide an efficient method for oral administration of medicaments to domesticated animals having improved sterility conditions, and an apparatus for accomplishing same.

Another object of the present invention is to provide an efficient method for effectively controlling infectious diseases among domesticated animals, and an apparatus for accomplishing same.

Yet another object of the present invention is to provide an efficient method for the oral administration to domesticated animals of vaccines or other medicaments, including antibiotic solutions, pharmacological agents, vitamin and mineral supplements, and growth supplements, among others, and an apparatus for accomplishing same.

Another object of the present invention is to provide an efficient method for the oral administration to domesticated animals of medicaments in which medicaments are administered at a specified flow rate, and an apparatus for accomplishing same.

A further object of the present invention is to provide an efficient method for the oral administration to domesticated animals of medicaments in which medicaments are added to the drinking water supply at more than one drinking station, and in which all drinking stations are supplied with medicaments originating at a common source, and an apparatus for accomplishing same.

A still further object of the present invention is to provide an efficient method for the oral administration to domesticated animals of medicaments in which medicaments are added to the drinking water supply at more than one drinking station, and in which the concentration of medicament at each of the drinking stations is substantially the same, and an apparatus for accomplishing same.

Another object of the present invention is to provide an efficient method for the oral administration to domesticated animals of vaccine in which an increased percentage of the targeted domesticated animal population is successfully vaccinated, and an apparatus for accomplishing same.

Another object of the present invention is to provide an efficient method for oral administration of the Newcastle Disease vaccine, the Laryngotracheitis vaccine and the Infectious Bronchitis vaccine to poultry, and an apparatus for accomplishing same.

A further object of the present invention is to provide a method for the oral administration to domesticated animals of medicaments which method is less sensitive to environmental conditions compared to oral administration of medicaments employing a proportioner system, and an apparatus for accomplishing same.

SUMMARY OF THE INVENTION

In accordance with the present invention, a method for orally administering medicaments such as vaccines, antibiotics, vitamin supplements, mineral supplements, growth supplements, among others, to domesticated animals comprises individually supplying medicament to a number of animal drinking stations simultaneously at dosage rates and dosage times which are substantially the same from station to station, by connecting a medicament reservoir to the drinking stations and causing the medicament to flow from the reservoir to the drinking stations via a plurality of tubes.

Also in accordance with the present invention, an apparatus for the oral administration of medicaments to domesticated animals comprises a reservoir capable of holding a medicament or a solution, emulsion, dispersion or other composition containing a medicament which is flowably connected to a series of animal drinking stations via a plurality of tubes.

DETAILED DESCRIPTION OF THE DRAWING AND CERTAIN PREFERRED EMBODIMENTS

Figure 1:
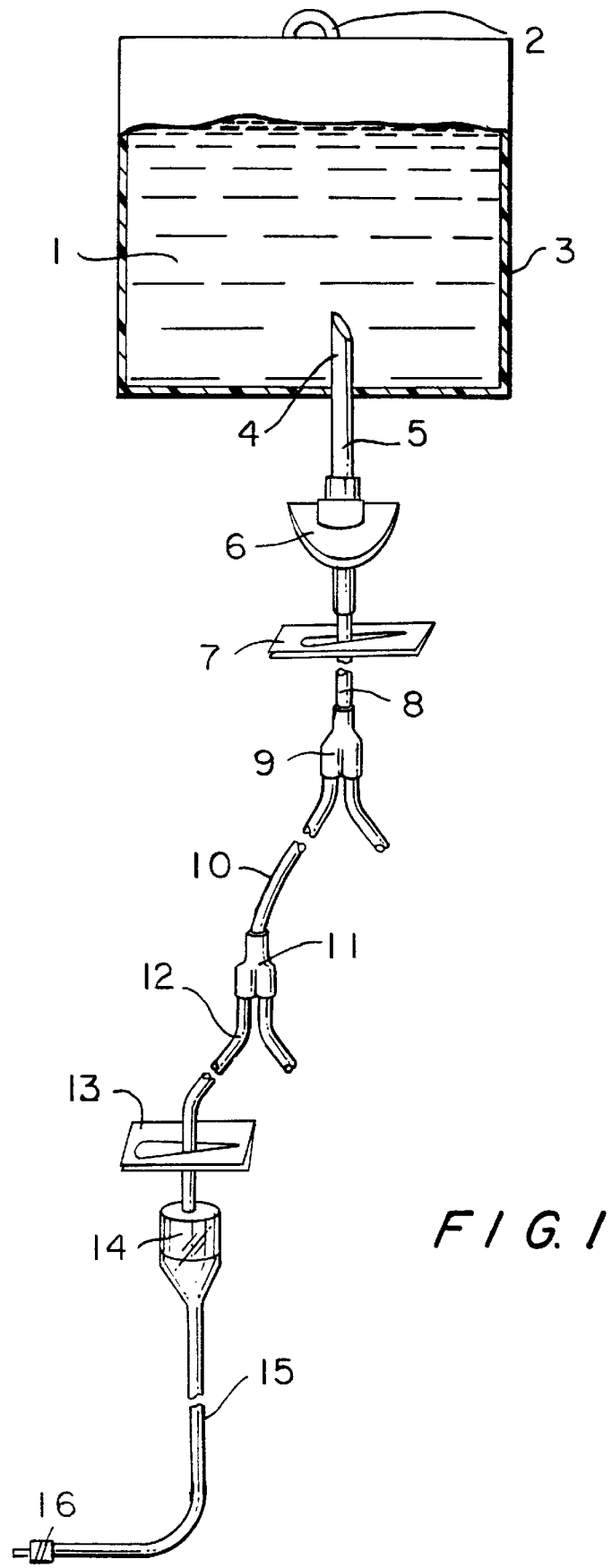
FIG. 1 is a side elevational view of a preferred embodiment of an apparatus for orally administering medicaments to domesticated animals in accordance with the teachings of the present invention.

Referring now to FIG. 1, there is illustrated a preferred embodiment of an apparatus for orally administering medicaments to domesticated animals in accordance with the present invention. As illustrated in FIG. 1, the apparatus comprises a diluent bag 3 containing a medicament 1, suspended above the remainder of the apparatus by an eyelet 2 by known means. A sharpened spike tip 4 of a hollow injection spike 5 is pierced into a single location on the diluent bag 3 below the greater portion of the medicament 1. Spike tip handle 6 facilitates the piercing of the diluent bag 3 with the spike 5 by providing a convenient manual grasping point on the spike 5. The hollow passage formed by injection spike 5 communicates with the interior of the diluent bag 3, thereby allowing the medicament 1 to flow out of the diluent bag 3 and into the remainder of the apparatus described below through the force of gravity or through the application of positive or negative pressure to the medicament by known means and methods.

First tube 8 communicates with the hollow injection spike 5 at the upstream end of said first tube 8. First tube clamp 7 is situated between the upstream and downstream ends of the first tube 8. Depending on its operational orientation relative to the first tube, the first tube clamp 7 either allows or prevents flow of medicament 1 through the first tube 8.

The downstream end of the first tube communicates with the upstream end of a first splitter 9. The first splitter 9 in turn defines two passages at its downstream end, each passage communicating back with the first tube 8, and further communicating with the upstream end of a second tube 10.

The downstream ends of the second tubes 10 communicate with the upstream ends of second splitters 11. In identical fashion to the first splitter, each second splitter 11 in turn defines two passages at its downstream end, each such passage communicating back with the downstream end of a second tube 10, and further communicating with the upstream end of a third tube 12. Second tube clamps 13 are situated between the upstream and downstream ends of the third tubes 12. Depending on its operational orientation relative to the third tubes 12, the second tube clamps 13 either allow or prevent flow of medicament 1 through the third tubes 12.

The downstream end of third tubes 12 communicate with the upstream ends of drip chambers 14. The drip chambers 14 are cylindrical and constructed of a transparent material through which, in normal operation of the apparatus, dripping medicament is observable, allowing for confirmation of medicament flow and measurement of medicament flow rate. The upstream ends of drip chambers 14 necessarily have larger diameters than that of the downstream ends of the third tubes 12 and are positioned with the downstream ends of third tubes 12 in such a manner as to allow for the formation of observable droplets within the drip chambers 14. The drip chambers taper at their downstream ends to diameters consistent with coupling to the upstream ends of fourth tubes 15, with which the downstream ends of the drip chambers 14 communicate.

Fourth tubes 15 terminate at valves 16 which are designed to communicate with a plurality of animal drinking stations (not shown) by known means.

To achieve even distribution of medicament 1 among the plurality of drinking stations, all similarly designated components are of substantially identical dimensions and construction. Therefore, for example, each third tube is of identical dimensions (diameter, length, etc.) and construction to each other third tube, each drip chamber is of identical dimensions and construction to each other drip chamber, each splitter is of identical dimensions and construction to each other splitter, and so on. Because these components are identical in dimension and construction, medicament will flow through each one of a given type of component at substantially similar rates, resulting in substantially similar amounts of medicament flowing into each drinking station. Moreover, by employing components of a relatively narrow diameter, medicament can be made to flow from the reservoir to the drinking stations over extended time periods. Moreover, various bag sizes can be used with specified tubing to provide desired vaccination time. For example, a 1200 ml bag with 0.2 mm tubing flowing at approximately 18 ml/minute will provide one hour of vaccination time. It may be desirable to include in the apparatus a further means for adjusting the medicament flow rate, such as a flow meter or adjustable clamp device.

By provision of an apparatus for orally administering medicaments to domesticated animals which employs a system of identical components which administer substantially identical dosages of medicament to each of a plurality of animal drinking stations, this invention provides an apparatus having increased dosing accuracy and precision in comparison to dosing apparatus, such as proportioner apparatus, of the prior art.

By provision of an apparatus for orally administering medicaments to domesticated animals which employs a system of components which administer medicament to each of a plurality of animal drinking stations over an extended dosing time period, this invention provides an apparatus having increased efficiency in comparison to dosing apparatus, such as proportioner apparatus, of the prior art.

The extended dosing time period is directly proportional to, if not identical to, the time necessary for all of the medicament to completely flow out of the reservoir and through the apparatus (the "flow time"). Flow time is a function of the internal dimensions of the apparatus tubing and tubing splitters: The greater the internal diameters of these components, the less the flow time for a given amount of medicament will be, and the greater the flow rate will be. In this way, values for tubing diameter and flow rate are inversely proportional to values for flow time.

The increased efficiency results from several advantageous features of the present invention. Whereas medicament added to a water supply by prior art methods such as by using a proportioner is generally allowed to remain in the water supply for extended time periods prior to animal ingestion and is thus subject to contamination and chemical breakdown, the present invention minimizes these effects by providing a source of pure and fresh medicament over an extended dosing period.

In one preferred embodiment, the invention provides a method for the administration of a vaccine, comprising the steps of (i) adding the vaccine to desired size of sterile diluent bag or bottle and mixing the vaccine with a diluent, (ii) hanging the vaccine diluent bag on a hook suspended above a plurality of animal drinking stations at a height greater than each of the plurality of drinking stations, preferably at a height of four or more feet above the plurality of drinking stations, (iii) inserting the injection spike from the drip chamber dosage set into the vaccine diluent bag, using a tubing clamp placed below the injection spike to prevent dispensing vaccine, (iv) connecting each dosage line to the water supply through a vaccine port in a saddle clamp valve installed on a water line in close proximity to an animal drinking station, (v) opening the saddle clamp valve and tubing clamp to begin vaccine flow into the water line by the force of gravity or by application of positive or negative pressure to the medicament, and (vi) providing animals with access to water lines.

A variety of diluents can be used in the diluent bags for mixing with the vaccine. Examples of suitable diluents include phosphate buffered saline; sterile water; balanced salt solutions; tris buffered saline; and sterile lactated Ringer's solution.

Various medicaments may be administered using this method including vaccines, antibiotics, pharmacological agents, vitamin and mineral supplements, and growth supplements.

This method may be used to administer oral medicaments through the drinking water to a variety of animals, including poultry, swine, cattle, horses, sheep, goats, mice, rats, rabbits, monkeys, dogs and cats. A better example of the present invention and its many advantages will be provided by the following examples, given by way of illustration.

EXAMPLES

The following examples further illustrate the advantages of the present invention, particularly as the present invention relates to the oral administration of vaccines to poultry.

Example 1

Comparison of Vaccine Titers Administered Via the Invention Versus Vaccine Titers Administered with Proportioner System.

Modified live poultry vaccines differ in the stability of the viral components. Certain vaccines, for instance the Newcastle Disease virus (NDV) vaccine, are relatively stable, and thus will not be significantly affected by changes in environmental conditions. Other vaccines, for instance, the Laryngotracheitis virus (LT) vaccine, are much more susceptible to adverse environmental conditions such as elevated temperatures and desication.

One method of measuring the stability of a vaccine is to calculate the "titer" of the vaccine. By this method, a sample of live vaccine is titrated against an appropriate antibody or antigen to determine the presence and amount of the virus. The amount of antibody required for the titration correlates to the amount of live virus present, precise measurements being made possible by the use of a calibration curve calculated with known amount of live virus.

Results of such titers are expressed in units of $10^x$/ml, where x is a value of, for instance, from 1 to 10. This measurement indicates that the titered sample contains a concentration of live virus which has $10^x$ EID50 doses or $10^x$ ELD50 doses per milliliter. An "EID50 dosage" refers to a dosage at which there is a 50% chance that an exposed embryo will be infected. Similarly, an "ELD50 dosage" is the dosage at which there is a 50% chance of embryo lethality upon exposure.

The invention minimizes adverse environmental effects on vaccines, resulting in titers from vaccines administered using the invention being equivalent to or superior to those in vaccines administered by traditional proportioner apparatus. A study comparing the viral titers of commercial NDV and LT modified live vaccines administered with the invention against viral titers of vaccines administered with a proportioner is illustrated in Table I.

TABLE I

VACCINE TITER RESULTS

|  | INVENTION | | PROPORTIONER | |
| --- | --- | --- | --- | --- |
| TIME | NDV TITER | LT TITER | NDV TITER | LT TITER* |
| 0 HOUR | $10^{7.2}$/ml* | $10^{4.7}$/ml | $10^{7.3}$/ml | NO TITER |
| 1 HOUR | $10^{4.3}$/ml | $10^{2.5}$/ml | $10^{4.6}$/ml | NO TITER |
| 2 HOURS | NOT RUN | $10^{1.2}$/ml | $10^{4.5}$/ml | NO TITER |
| 3 HOURS | $10^{4.7}$/ml | $10^{2.0}$/ml | $10^{4.5}$/ml | NO TITER |
| 4 HOURS | NOT RUN | $10^{2.0}$/ml | $10^{4.5}$/ml | NO TITER |

*Samples were titrated twice to verify results

This study demonstrates that traditional proportioner administration of a modified live vaccine produced from a labile virus like LT may destroy the vaccine, resulting in poorly vaccinated flocks which are susceptible to disease.

Example 2

Challenge Results in Chickens Vaccinated with a Modified Live LT Vaccine Administered with the Invention.

Approximately 50 chickens were vaccinated at 11 days of age with a commercial LT modified live vaccine administered using the invention. A group of approximately 25 untreated chickens served as controls. All chickens were challenged with a virulent strain of LT virus at either day 25 or day 42 of age. Challenge results are shown in Table II.

TABLE II

LT CHALLENGE RESULTS*

| AGE AT CHALLENGE | NO. PROTECTED/TOTAL | PERCENT PROTECTED |
|---|---|---|
| 25 DAYS | 21/25 | 84% |
| 42 DAYS | 19/24 | 79% |

*All unvaccinated controls died from the challenge

Chickens vaccinated with a modified live LT vaccine administered using the invention exhibit significant protective response against an otherwise lethal virus challenge.

Example III

Comparison of LT Challenge Results Between Houses Vaccinated with the Invention Versus Houses Vaccinated with Proportioner.

Chicken houses 1 and 2 were vaccinated with a commercial modified live LT vaccine using the invention. Chicken houses 3 and 4 were vaccinated with the same vaccine administered with proportioner apparatus. A group of unvaccinated controls were also included in the study. The results are shown in Table III:

TABLE III

LT CHALLENGE RESULTS

| GROUP | VACCINE METHOD | PERCENT PROTECTED |
|---|---|---|
| HOUSE 1* | INVENTION | 100% |
| HOUSE 2 | INVENTION | 100% |
| HOUSE 3 | PROPORTIONER | 60% |
| HOUSE 4 | PROPORTIONER | 64% |
| CONTROLS | UNVACCINATED | 0% |

*A "House" refers to approximately 20,000 chickens.

Chickens vaccinated with a modified live LT vaccine administered by the invention were significantly more protected than chickens vaccinated with the same vaccine administered using proportioner apparatus.

Example IV

Comparison of Infectious Bronchitis (IB) Challenge Results Between Houses Vaccinated with the Invention Versus Houses Vaccinated with Proportioner.

Chicken houses 1 and 2 were vaccinated with a commercial modified live IB vaccine using proportioner apparatus. Houses 3 and 4 were vaccinated with the same vaccine administered with the invention. Challenge results are shown in Table IV.

TABLE IV

IB CHALLENGE RESULTS

| GROUP | METHOD | POSITIVE/TOTAL | % PROTECTION |
|---|---|---|---|
| HOUSES 1 & 2 | PROPORTIONER | 10/20 | 50% |
| HOUSES 3 & 4 | INVENTION | 6/20 | 70% |

Administration of a modified live IB vaccine using the invention elicited a significantly greater protective response against virulent challenge than did vaccination administered with proportioner apparatus.

The terms and expressions which have been employed are used as terms of description and not limitations, and there is no intention in the use of such terms or expressions of excluding any equivalents of the features shown and described as portions thereof, its being recognized that various modifications are possible within the scope of the invention.

What is claimed is:

1. A method for orally administering medicaments to a plurality of domesticated animals, comprising the steps of:
   connecting a closed bag-like medicament reservoir to a plurality of animal drinking stations with a plurality of tubes each of a predetermined diameter;
   causing medicament to flow from said medicament reservoir to each of said plurality of drinking stations at substantially identical rates; and
   providing said plurality of domesticated animals with access to said plurality of drinking stations.

2. The method as defined in claim 1, wherein each member of said plurality of domesticated animals is identical in species, and wherein said species is selected from the group consisting of poultry, swine, cattle, horses, sheep, goats, rats, rabbits, monkeys, dogs and cats.

3. The method as defined in claim 1, wherein said medicament comprises one or more of modified live vaccines, killed vaccines, antibiotics, vitamin supplements, mineral supplements, and growth supplements.

4. The method as defined in claim 3, wherein said live vaccines comprise modified live infectious bronchitis vaccine, modified live laryngotracheitis virus vaccine, and modified live Newcastle Disease virus vaccine.

5. The method as defined in claim 1, wherein said medicament reservoir is suspended at a height greater than that of each of said plurality of drinking stations.

6. The method as defined in claim 5, wherein said medicament reservoir is suspended at a height of four or more feet above said drinking stations.

7. The method as defined in claim 1, wherein said medicament reservoir comprises a sterile container, a predetermined amount of a medicament, and a predetermined amount of a diluent.

8. The method as defined in claim 7, wherein said diluents comprise one or more of phosphate buffered saline, sterile water, balanced salt solutions, tris buffered saline and sterile lactated Ringer's solution.

9. The method as defined in claim 1, wherein the diameter of said tubing is directly proportional to the flow rate, and inversely proportional to the flow time, of said medicament.

10. The method as defined in claim 1, wherein a drip chamber is downstream of said medicament reservoir, and whereby medicament dripping through said drip chamber is observable.

11. The method as defined in claim 1, wherein a hollow injection spike connects said tubing to said reservoir.

12. An apparatus for the oral administration of medicaments to domesticated animals comprising:
   a reservoir comprising a container and a medicament;
   a first tube communicating with and positioned downstream from said reservoir;
   a plurality of second tubes, each independently communicating with and positioned downstream from said first tube; and
   each of said second tubes connected to separate animal drinking stations.

13. The apparatus as defined in claim 12, further comprising means for observing the rate of flow of said composition through each of said plurality of second tubes.

14. The apparatus as defined in claim 13, wherein said means for observing comprises a transparent drip chamber.

15. The apparatus as defined in claim 12, said apparatus further comprising a first means for preventing the flow of a liquid through said first tube.

16. The apparatus as defined in claim 15, said apparatus further comprising a second means for preventing the flow of a liquid through any one or more of said plurality of second tubes.

17. The apparatus as defined in claim 16, wherein said first and second preventing means comprise tube clamps.

18. The apparatus as defined in claim 12, said apparatus further comprising a means for adjusting the rate of flow of a liquid through any one or more of said plurality of second tubes.

19. The apparatus as defined in claim 12, wherein said first tube communicates with said reservoir through a hollow injection spike.

20. The apparatus as defined in claim 19, wherein said hollow injection spike comprises a sharp end and a handle end.

21. The apparatus as defined in claim 12, wherein said container is selected from the group consisting of a sterile diluent bag and a bottle.

22. The apparatus as defined in claim 12, wherein said first tube communicates with said plurality of second tubes through one or more tube splitting devices.

23. The apparatus as defined in claim 12, wherein the flow of liquid from said reservoir through said first and second tubes is caused by gravity.

24. A method for orally administrating medicaments to a plurality of domesticated animals, comprising the steps of:

connecting a medicament reservoir comprising a sterile container, a predetermined amount of a medicament, and a predetermined amount of a diluent to a plurality of animal drinking stations with a plurality of tubes each of a predetermined diameter;

causing medicament to flow from said medicament reservoir to each of said plurality of drinking stations at substantially identical rates; and providing said plurality of domesticated animals with access to said plurality of drinking stations.

25. A method for orally administrating medicaments to a plurality of domesticated animals, comprising the steps of:

connecting a medicament reservoir comprising to a plurality of animal drinking stations with a plurality of tubes each of a predetermined diameter;

causing medicament to flow from said medicament reservoir to each of said plurality of drinking stations at substantially identical rates wherein a drip chamber is downstream of said medicament reservoir, and whereby medicament dripping through said drip chamber is observable; and providing said plurality of domesticated animals with access to said plurality of drinking stations.

26. An apparatus for the oral administration of medicaments to domesticated animals comprising:

a closed reservoir comprising a flexible bag-like container and a medicament;

a first tube communicating with and positioned downstream from said reservoir;

a plurality of second tubes, each independently communicating with and positioned downstream from said first tube, said second tubes containing a means for observing the rate of flow of said composition through said second tubes;

each of said second tubes connected to separate animal drinking stations.

* * * * *

UNITED STATES PATENT AND TRADEMARK OFFICE
CERTIFICATE OF CORRECTION

PATENT NO. : 5,884,583
DATED : March 23, 1999
INVENTOR(S) : Joseph J. Johnston, Jr. et al.

It is certified that error appears in the above-identified patent and that said Letters Patent is hereby corrected as shown below:

Column 10,
Line 11, please delete "comprising".

Signed and Sealed this

Thirty-first Day of December, 2002

JAMES E. ROGAN
*Director of the United States Patent and Trademark Office*